US008850321B2

(12) United States Patent
Seeger et al.

(10) Patent No.: US 8,850,321 B2
(45) Date of Patent: Sep. 30, 2014

(54) CROSS-DOMAIN BUSINESS SERVICE MANAGEMENT

(75) Inventors: Joachim Seeger, Boeblingen (DE); Holger Zecha, Boeblingen (DE); Andre Gebert, Boeblingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 486 days.

(21) Appl. No.: 12/821,457

(22) Filed: Jun. 23, 2010

(65) Prior Publication Data

US 2011/0320971 A1 Dec. 29, 2011

(51) Int. Cl.
*G06F 15/177* (2006.01)

(52) U.S. Cl.
USPC ........... 715/734; 715/736; 715/738; 715/764; 715/771; 709/223; 709/224; 709/226

(58) Field of Classification Search
USPC .......... 715/734, 736, 738, 764, 771; 709/223, 709/224, 226
See application file for complete search history.

(56) References Cited

U.S. PATENT DOCUMENTS

| 5,049,873 | A  | * | 9/1991  | Robins et al. ............... 370/254 |
| 6,754,470 | B2 | * | 6/2004  | Hendrickson et al. ...... 455/67.11 |
| 7,096,368 | B2 | * | 8/2006  | Kouznetsov et al. ........ 713/189 |
| 7,634,579 | B1 | * | 12/2009 | Kalbarga ..................... 709/248 |
| 7,822,850 | B1 | * | 10/2010 | Brikman et al. ............. 709/224 |
| 7,926,113 | B1 | * | 4/2011  | Gula et al. ..................... 726/25 |
| 8,060,470 | B2 | * | 11/2011 | Davidson et al. ............ 707/634 |
| 2002/0087949 | A1 | * | 7/2002  | Golender et al. ............ 717/124 |
| 2002/0165902 | A1 | * | 11/2002 | Robb et al. .................... 709/202 |
| 2002/0188485 | A1 |   | 12/2002 | Benny et al. |
| 2005/0165881 | A1 | * | 7/2005  | Brooks et al. ................ 709/200 |
| 2006/0112175 | A1 | * | 5/2006  | Sellers et al. ................ 709/223 |
| 2006/0206440 | A1 | * | 9/2006  | Anderson et al. ............ 705/500 |
| 2008/0177795 | A1 |   | 7/2008  | Benny et al. |
| 2008/0189761 | A1 | * | 8/2008  | Brodie et al. ..................... 726/1 |
| 2009/0240674 | A1 | * | 9/2009  | Wilde et al. ..................... 707/4 |
| 2012/0089904 | A1 | * | 4/2012  | Datha et al. ................... 715/236 |
| 2012/0221589 | A1 | * | 8/2012  | Shahar et al. ................ 707/758 |

OTHER PUBLICATIONS

CogNiTioN; Intro to cron; Dec. 30, 1999; UnixGeeks.org; pp. 1-6.*
HP Operations Manager i 8.10 software, Product Data Sheet, https://h10078.www1.hp.com/cda/hpdc/fetchPDF.do, Jan. 1, 2010, 8 pgs.

* cited by examiner

*Primary Examiner* — Andrew Dyer

(57) ABSTRACT

Systems, methods, and machine readable and executable instructions are provided for cross-domain business service management. Cross-domain business service management can include receiving event indications from domains. The event indications can be standardized into standardized event indications independent of domain manager or domain-specific syntax. The standardized event indications can be aggregated into aggregated event indications. A number of domain-specific descriptive semantic attributes of the aggregated event indications can be runtime analyzed. The aggregated event indications can be mapped to respective health indicators based on the runtime analysis, where each of the respective health indicators represents a health aspect of one of the domains. The respective health indicators can be displayed on a user interface.

13 Claims, 6 Drawing Sheets

CROSS-DOMAIN BUSINESS SERVICE MANAGEMENT

BACKGROUND

The information technology (IT) environment may be a significant factor in the operational success of a business. For example, a business operating an online store may not be able to process sales if the business's inventory system is not functioning and/or is functioning poorly. Fast changing business objectives may contribute to increasing modularity of IT applications, which may make the IT applications more interdependent and complex to manage.

The IT environment may include computing networks with machines (e.g., electronic devices) such as routers, switches, hubs, servers, desktop PCs, laptops, workstations, and peripheral devices (e.g., printers, facsimile devices, and scanners, etc.) networked together. Such machines may include processor and memory resources and/or logic (e.g., embedded in an application specific integrated circuit (ASIC)). The IT environment may be divided into domains such as mail, applications, databases, network, operating systems, files, internet and/or intranet, among others. Domain may include one or more servers to provide functionality for the domain, such as a mail server providing email functionality. Additionally, domains may include a domain manager to control and/or monitor certain aspects within the domain.

DETAILED DESCRIPTION

Figure 1A:
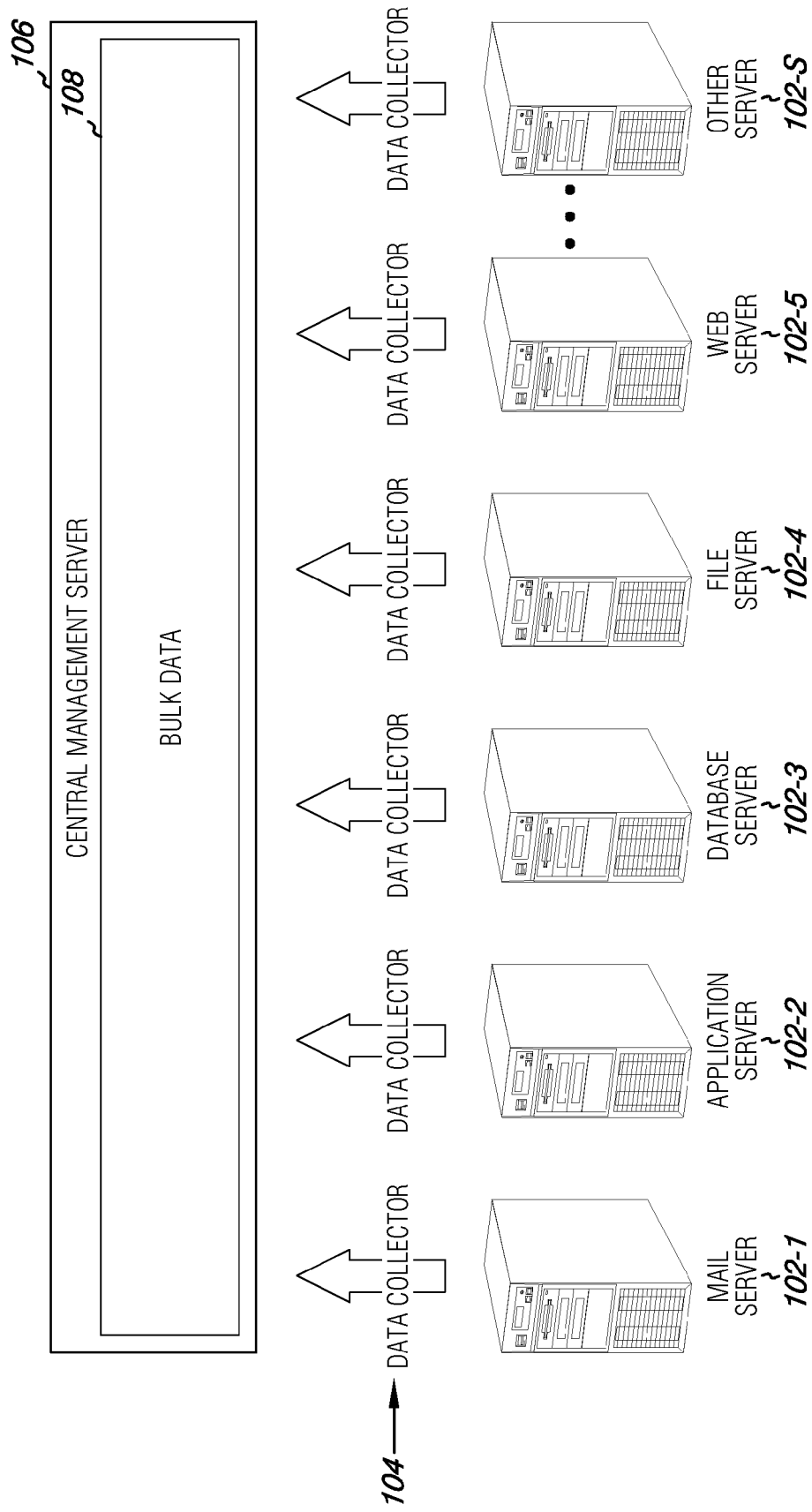
FIGS. 1A-1B illustrate block diagrams of examples of business service management solutions according to some previous approaches.

Embodiments of the present disclosure may include methods, systems, and machine readable and executable instructions and/or logic. Cross-domain business service management can include receiving event indications from domains. The event indications can be standardized into standardized event indications independent of the domain manager and/or domain specific syntax. The standardized event indications can be aggregated into aggregated event indications. The aggregated event indications can be mapped to respective health indicators by runtime analyzing domain-specific descriptive semantic attributes, where each of the respective health indicators represents a health aspect of one of the domains. The respective health indicators can be displayed on a user interface.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designators "N," "M," "P," "Q," "R," "S," and "T," particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 202 may reference element "02" in FIG. 2, and a similar element may be referenced as 302 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1B:
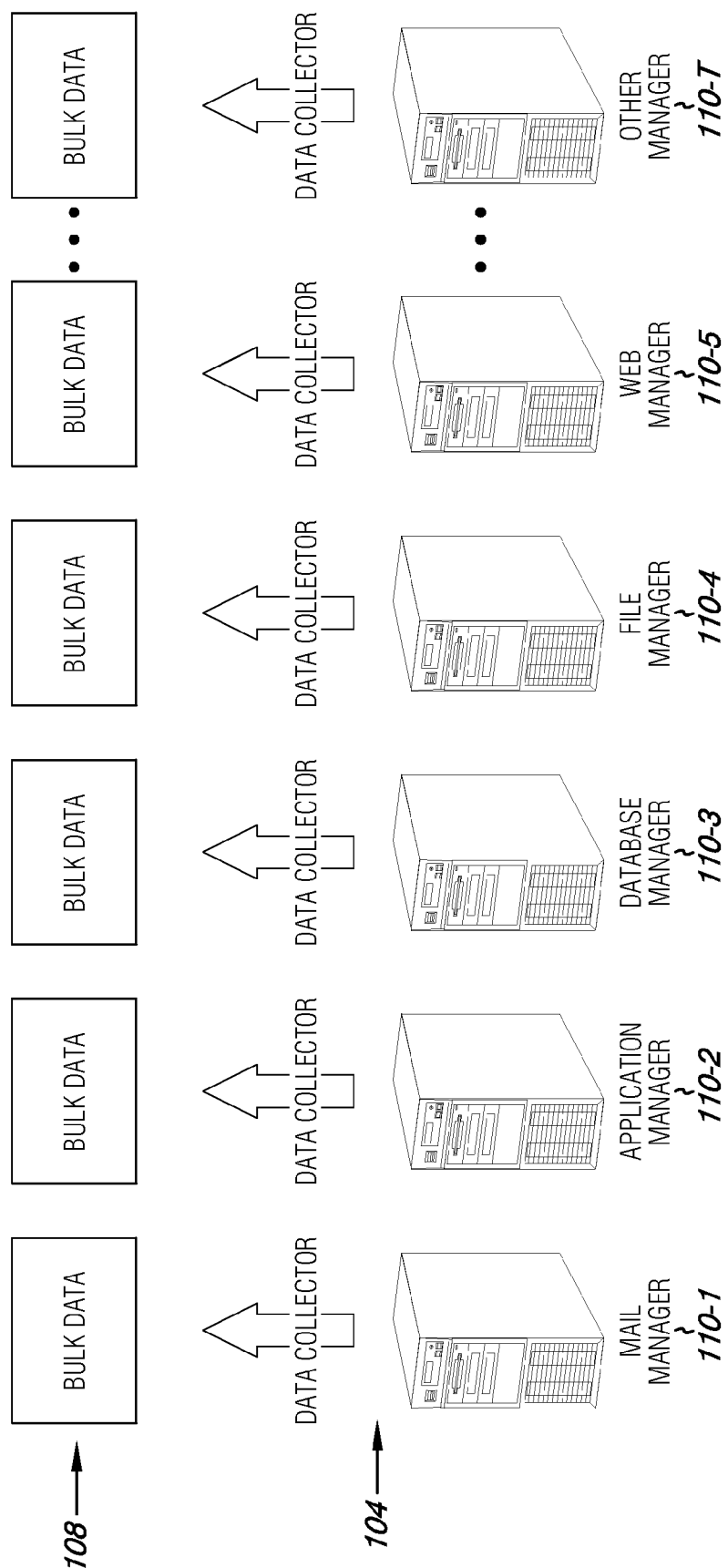

FIGS. 1A-1B illustrate block diagrams of examples of business service management solutions according to some previous approaches. Restrained by technical conditions, some previous approaches to IT solutions focused on managing what can be monitored rather than what should be monitored. In a modular and complex IT landscape, such management solutions may result in monitors for many technical details of managed applications regardless of whether the level of detail was beneficial to the solution. Such previous approaches could result in message storms, even though few of the incoming event metrics may actually be helpful to the solution. Furthermore, such previous approaches could result in multiple, different notifications of the same incident. For example, a database monitor may report an application failure and an application monitor may report a database failure.

FIG. 1A illustrates a block diagram of an example of a business service management solution according to some previous approaches. The IT landscape illustrated in FIG. 1A includes a number of domains represented by a mail server 102-1, an application server 102-2, a database server 102-3, a file server 102-4, a web (e.g., Internet) server 102-5, and an other server 102-S. The number and type of servers included in FIG. 1A are intended to be illustrative of an example of an IT landscape. It will be appreciated that an IT landscape may include more, fewer, duplicate, and/or other types of domains.

The IT landscape illustrated in FIG. 1A includes a number of data collectors 104 (e.g., one data collector associated with each domain 102-1, . . . , 102-S). The data collectors 104 may be applications running on each associated server, applications running on the central management server 106, separate machines such as network probes, or other applications and/or devices for gathering network data. As illustrated, the data collectors 104 collect data from each associated domain 102-1, . . . , 102-S and report the data to the central management server 106.

The central management server 106 may be configured to capture, manage, store, preserver, and deliver content related to business service management of the IT landscape. The central management server 106 may manage, monitor, and/or control the domains 102-1, . . . , 102-S providing the applications and/or data within the IT landscape.

As illustrated, according to some previous approaches, the central management server 106 may collect bulk data 108 from each of the domains 102-1, . . . . , 102-S via the data collectors 104. The bulk data 108 received according to such previous approaches may result in too much "noise" in the central management server 106, which may make it difficult to distinguish between metrics that are meaningful to an IT solution and metrics that are less meaningful or not meaningful to the IT solution.

FIG. 1B illustrates a block diagram of an example of a business service management solution according to some previous approaches. The IT landscape illustrated in FIG. 1B includes a number of domain managers including a mail domain manager 110-1, an application domain manager 110-2, a database domain manager 110-3, a file domain manager 110-4, a web (e.g., Internet) domain manager 110-5, and an other domain manager 110-S. Each of the domain managers 110-1, . . . , 110-T illustrated in FIG. 1B may represent an isolated management solution for a particular domain (e.g., database domain manager 110-3 may represent an isolated management solution for a database domain). Each domain may be provided by one or more servers (e.g., the database domain may be provided by one or more database servers 102-3 as illustrated in FIG. 1A).

The IT landscape illustrated in FIG. 1B includes a number of data collectors 104 (e.g., one data collector associated with each domain manager 110-1, . . . , 110-T). The data collectors 104 may be applications running on each associated domain manager 110-1, . . . , 110-T, applications running on a separate management server, separate machines such as network probes, or other applications and/or devices for gathering network data. As illustrated, the data collectors 104 collect data associated with each associated domain manager 110-1, . . . , 110-T and report the bulk data 108 for each individual domain manager 110-1, . . . , 110-T. The bulk data 108 may be reported within each domain manager (e.g., bulk data 108 associated with mail domain manager 110-1 may be reported to an application running on the mail domain manager 110-1).

According to such previous approaches, when different domain management solutions exist, the bulk data problem can be even worse than the example illustrated in FIG. 1A because without a common information source, cross-domain application management may not be possible. That is, the bulk data 108 for each domain manager 110-1, . . . , 110-T may exist as an island with respect to the bulk data 108 associated with the other domain managers 110-1, . . . , 110-T. Accordingly, the IT landscape may be flooded with "noise" such that an outage of a single application can result in multiple, different notifications of the same incident.

Figure 2:
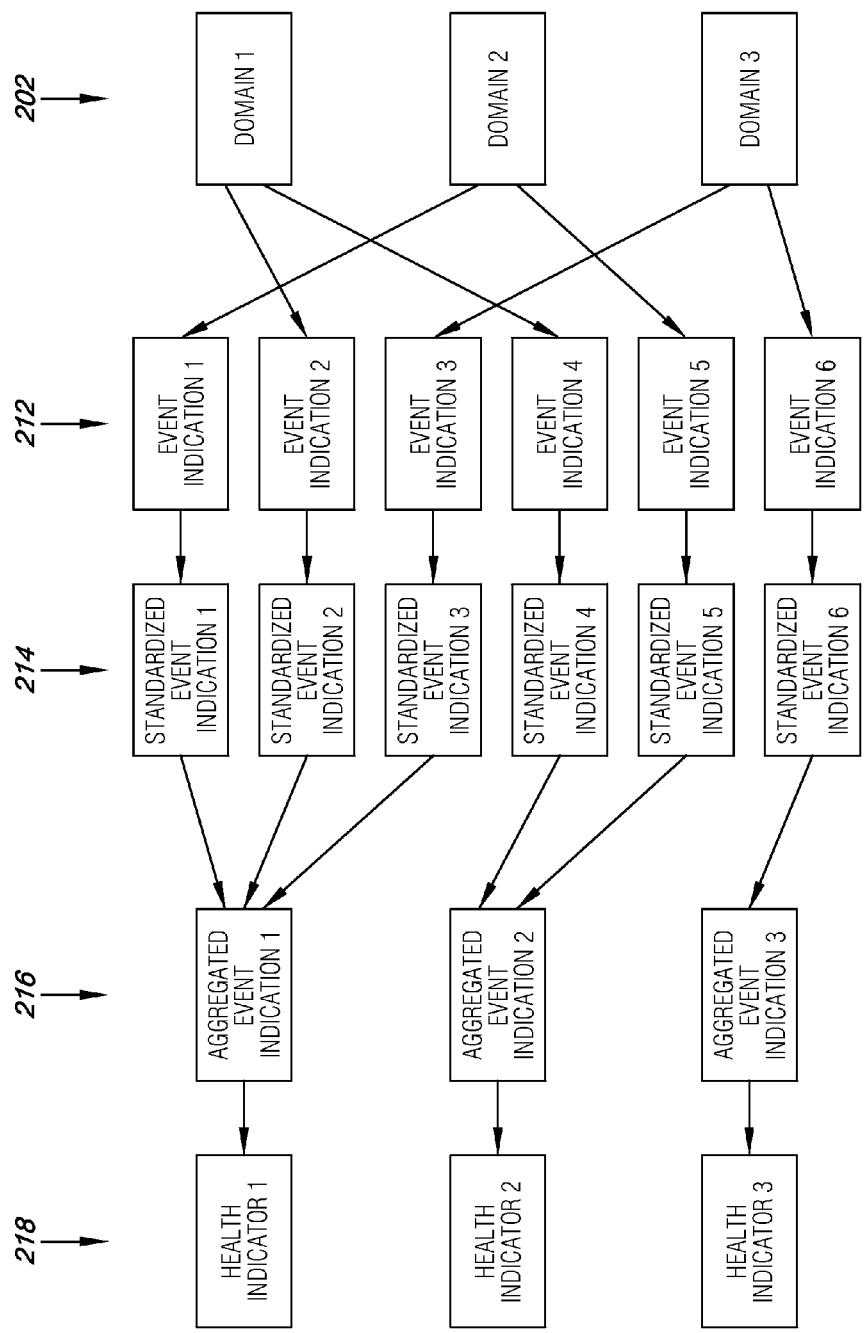
FIG. 2 provides a block diagram illustrating alignment of cross-domain events with a number of domain manager independent health indicators according to the present disclosure.

FIG. 2 provides a block diagram illustrating alignment of cross-domain events with a number of domain manager independent health indicators according to the present disclosure. Because the information technology (IT) landscape, in some instances, is no longer a collection of standalone applications for which dedicated application experts are responsible, a centralized, application-independent management solution can be beneficial. Cross-domain business service management can shift from silo-based data providers to a solution that takes into account the semantic relations between the infrastructure and the applications and incorporates built-in domain knowledge that answers higher level questions rather than just providing bulk data regarding the IT landscape. Businesses are interested in the health of the business process, business process steps, and the applications that the business process steps are running on, as implemented in the IT landscape. In some IT landscapes, many applications may be interrelated on various levels.

In order to extract important metrics from various domain mangers and/or data collectors, examples of the present disclosure can represent relationships between domains and/or applications in a domain-independent manner in a cross-domain business service management context. According to the present disclosure, questions drive data collection and evaluation of metrics rather than relying on bulk data. Identification of what to monitor can be beneficial as opposed to bulk monitoring of many and/or all IT landscape components. For cross-domain business service management, data can be linked semantically to provide more useful information (e.g., data from applications can be linked independent of domain manager and/or domain-specific syntax).

The example embodiment illustrated in FIG. 2 includes a plurality of domains 202 (e.g., three domains). The particular numbers of domains, events, and health indicators illustrated in FIG. 2 are merely examples and should not be taken in a limiting sense. Examples of the present disclosure can be applied regardless of the number of domains, events, and/or health indicators used with a particular IT landscape. The domains 202 can be provided by machines, such as servers, providing a mail domain, an application domain, a database domain, a file domain, a web interface, or other types of domains that may be included within an IT landscape. Such machines can include processor and memory resources for executing instructions stored in a tangible non-transitory medium and/or an application specific integrated circuit (ASIC) including logic configured to perform various examples of the present disclosure. Furthermore, the domains 202 illustrated in FIG. 2, can include a domain manager, although the same is not specifically illustrated so as not to obscure the teachings associated with FIG. 2.

A plurality of event indications 212 can be received from the plurality of domains 202. As illustrated in FIG. 2, event indications 2 and 4 are received from domain 1, event indications 1 and 5 are received from domain 2, and event indications 3 and 6 are received from domain 3. The event indications 212 can be alerts for actual events occurring with respect to particular devices and/or applications within a particular domain. Some examples of event indications 212 include, "memory utilization exceeded," "average query time exceeded," "connection to device not detected," among others. Event indications 212 can be received from data collectors such as network probes, domain managers, etc. as described herein. The event indications 212 can be received from data collectors associated with the domains 202 directly, with data collectors associated with domain managers directly, or directly from domain managers themselves.

An event indication 212 received from a particular domain includes domain manager and/or domain-specific syntax. For example, and event indication 212 received from a Hewlett Packard Operations Manager includes syntax specific to the Hewlett Packard Operations Manager system (e.g., the event indication 212 may be in a particular language, may include headers particular to the domain, etc.). Context in domain manager and/or domain-specific syntax may not be shared with other domains and/or managers. Accordingly, such context can be described as domain manager and/or domain-specific, because it can identify the domain manager and/or domain from which it was received. Furthermore, the semantic attributes of the event indications 212 can be said to be descriptive because the event indications 212 can, within the context of their semantics, identify a particular event. The event indications 212 are the raw event indications received from the domains 202.

The plurality of event indications 212 can be standardized into a plurality of standardized event indications 214 independent of the domain manager and/or domain-specific syntax. That is, the standardized event indications 214 can include information identifying the event being reported, but generally do not include the domain-specific context described above. As illustrated in FIG. 2, there can be a one-to-one correspondence between the event indications 212 and the standardized event indications 214.

For example, an event indication from a first particular domain manager and/or domain could include, "processor X usage is greater than 90%." An event indication for a second particular domain manager and/or domain could include, "processor X usage is within a defined threshold of maximum." Both of these event indications can be semantically linked to indicate collectively that the usage of processor X is too high although the syntax between the different domain managers and/or domains is different.

Once the event indications 212 have been standardized into standardized event indications 214 (e.g., without being clouded by the domain-specific syntax), it can become apparent, which event indications 212 received from different domains 202 pertain to a same actual event. Accordingly, the plurality of standardized event indications 214 can be aggregated into a number of aggregated event indications 216. In the example illustrated in FIG. 2, standardized event indications 1, 2, and 3, are aggregated into aggregated event indication 1, standardized event indications 4 and 5 are aggregated into aggregated event indication 2, and standardized event indication 6 is aggregated into aggregated event indication 3. As used herein, "aggregation" does not imply that more than one standardized event indication needs to be combined (e.g., one standardized event indication 214 can be aggregated into one aggregated event indication 216). Each aggregated event indication 216 can be indicative of a same, unique, actual event that has occurred within the IT landscape.

Runtime analysis of domain-specific descriptive semantic attributes can identify the context of the aggregated event indications 216, identify a number of domain managers and/or domains associated with the aggregated event indications 216, and enable mapping of the aggregated event indications 216 to a respective number of health indicators 218 based on the runtime analysis.

The number of aggregated events 216 can be mapped to a respective number of health indicators 218. Each of the respective number of health indicators 218 can represent a health aspect of one of the plurality of domains 202. The health indicators 218 can be predefined abstract management entities for a particular IT landscape and/or a portion thereof. For example, a particular domain 202 may have certain aspects of health associated therewith, such as processor and memory resources, network connectivity, and various aspects of application functionality, among others. The health aspects of a particular domain 202 can be defined and represented as a health indicator 218. At least one of the respective number of health indicators 218 can be displayed on a user interface as described in more detail herein. Presenting health aspects of an IT landscape to a user in the form of health indicators 218 can provide a top-down approach to understanding application behavior without reading bulk data concerning events from different data sources. The health indicators 218 can represent application health in the context of business service management.

Figure 3:
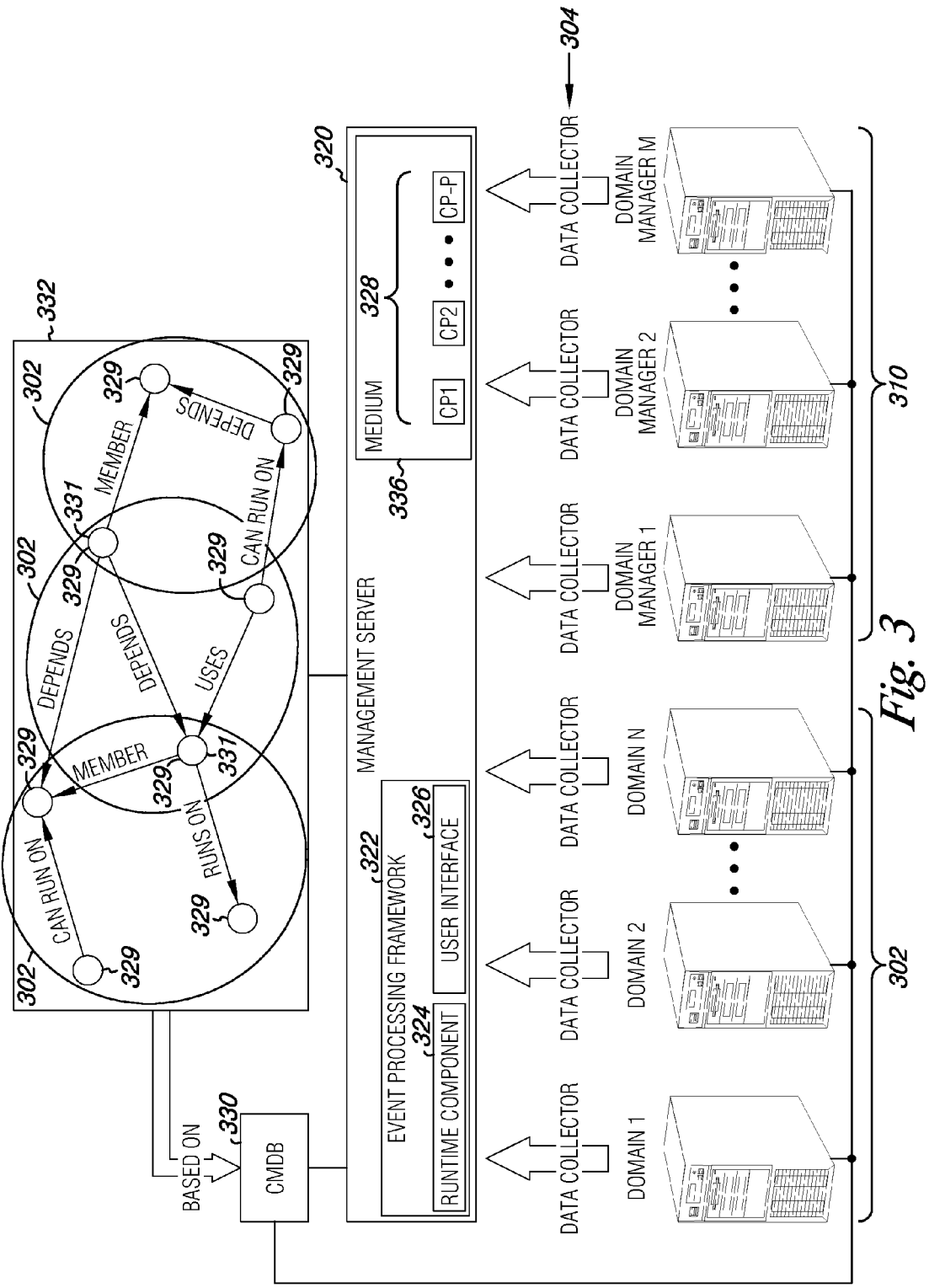
FIG. 3 illustrates a block diagram of an example of a system for cross-domain business service management according to the present disclosure.

FIG. 3 illustrates a block diagram of an example of a system for cross-domain business service management according to the present disclosure. The example illustrated in FIG. 3 includes a plurality of domains 302 (e.g., domains 1, 2, ... N) and a plurality of domain managers 310 (e.g., domain managers 1, 2, ..., M). Examples are not limited to the specific numbers of domains 302 and/or domain managers 310 illustrated in FIG. 3. Furthermore, examples are not limited to having both domains 302 and/or domain managers 310, as examples can include both together, or either individually. Although not specifically illustrated, each domain manager 310 can be associated with a particular domain 302.

Each domain 302 and domain manager 310 is illustrated with an associated data collector 304 as described herein. The plurality of data collectors 304 can monitor the plurality of domains 302 and/or domain managers 310 and generate a plurality of event indications as described herein. Additionally, a domain manager 310 can generate event indications (e.g., by operation of a data collector application running on the domain manager 310).

The event indications can be reported to a management server 320. The management server 320 can include one or more physical machines (e.g., computing devices including processor and memory resources). The management server 320 can provide an event processing framework 322 including a runtime component 324 and a user interface 326. Although illustrated as being directly associate with the event processing framework 322, the user interface 326 can, in some embodiments, be directly associated with the management server 320 without being directly associated with the event processing framework 322. The event processing framework can alternatively be provided by a virtual machine (e.g., running on a physical machine other than a management server 320). The management server 320 can include a content pack 328 (e.g., stored in a tangible non-transitory medium 336) for each of the plurality of domains 302 and/or domain managers 310. In an example of the present disclosure, the event processing framework 322 can be provided by a first party and a number of third party domain managers 310 can be provided to monitor a plurality of domains 302 and generate event indications in addition to the event indications generated by the data collectors 304. The content packs 328 can be provided by the first party to facilitate analysis of the event indications generated by the third party domain managers 310.

The content packs 328 can include information to identify a number of semantic relations of a corresponding domain 302 and/or define a number of health aspects of the corresponding domain 302. Content packs 328 can also be provided for those domains managed by a domain manager 310. The content packs 328 can include information defining health aspects of the domain 302 to which they correspond (e.g., to managed applications in the domain 302 to which the content packs 328 correspond). Providing domain-specific content packs 328 (e.g., as opposed to providing content packs related to an overall IT landscape) can be beneficial in allowing independent release and/or update schedules for content packs 328 corresponding to different domains 302. Additional benefits include an ability to incorporate domain 302 knowledge from different product organizations such as Professional Service Organizations (PSO) and/or Consulting and Integration (C&I), among others.

The runtime component 324 can include logic configured to and/or machine readable instructions executable to analyze a number of domain-specific descriptive semantic attributes of the plurality of event indications. Runtime analyzing the number of domain-specific descriptive semantic attributes of the number of aggregated event indications can include interpreting each of the number of aggregated event indications according to a corresponding content pack 328. The runtime component 324 can standardize the plurality of event indications into a plurality of standardized event indications independent of the domain manager and/or domain-specific syntax based on the analysis. The runtime component 324 can aggregate the plurality of standardized event indications into a number of aggregated event indications.

The runtime component 324 can map the number of aggregated event indications to a respective number of health indicators based on a runtime analysis of the number of domain-specific descriptive semantic attributes of the number of aggregated event indications. As described herein, each of the respective number of health indicators represents a health aspect of one of the plurality of domains 302. Each health indicator is related to one configuration item 329 whereas each configuration item 329 may be related to a plurality of health indicators. The health aspects of the domains 302 can be defined by information contained in the content packs 328.

Domain knowledge can be extracted from an application and used to create an abstract for each individual domain 302. With such an abstraction layer in place, a single configuration management database (CMDB) 330 can be used for the discovery and inventory of application and business processes. The CMDB 330 can be used to establish a relationship between the plurality of domains 302 and an overall business service facilitated by the plurality of domains 302 based on the content pack 328 for each of the plurality of domains 302. The established relationships can identify a connection between single applications and an overall business process (referred to in the CMDB context as configuration items 329). For example, a number of configuration items 329 can be defined between the plurality of domains 302 based on the information included in the content packs 328. The number of defined configuration items 329 can be applied to a topology map of the plurality of domains 302 to create a semantic network 332.

Besides illustrating the topology of an IT landscape, the semantic network 332 can illustrate specifics of the configuration items 329 between domains 302. For example, the semantic network 332 illustrated in FIG. 3 displays a number of configuration items 329. A configuration items 329 between two or more domains 302 is referred to herein as an interface 331, however, this does not imply that the interface 331 is a physical interface between domains 302. The semantic network 332 displays some specifics about the relations between the configuration items 329 such as, "can run on," "depends," "member," runs on," "uses," etc. Such information can be useful both to a user of the system and to the system itself. A user can view the information and use it to make decisions about how the configuration items 329 can be altered to provide better reliability and the like. For example, if a significant number of domains 302 depend on a particular configuration item 329, the user may wish to reorganize the IT landscape to provide redundancy for the heavily depended upon configuration item 329. The information can also be useful to the system to help with analysis of a cause of an aggregated event. For example, a content pack 328 can include a defined rule (e.g., in the runtime component 324) corresponding to the domain 302 corresponding to the content pack 328 associated with the aggregated event. The analysis application can be executed to use the semantic net 332 to facilitate identification of a cause of an aggregated event that has more than one event indication.

The user interface 326 can be configured to display information related to cross-domain business service management as described herein. For example, the user interface 326 can display the semantic network 332. The user interface 326 can be configured to display at least one of the number of health indicators (e.g., health indicators 218 as illustrated in FIG. 2) and the configuration items 329 to which the health indicators are related. Such functionality can be beneficial to enable visualization of the health aspects of the corresponding domains 302. In one example, the user interface 326 can display at least one of the respective number of health indicators without displaying a corresponding one of the plurality of event indications. Such an example can be beneficial in reducing the volume of information displayed to a user to allow the user to more quickly identify important information regarding health aspects of the IT landscape. For example, the user interface 326 can display a result of the analysis of the cause of one of the number of aggregated events.

Consider, for example, an electric distribution network as an analogy for an IT landscape. Data collectors can be provided for the power cables, for the power station, and for electricity consumers, which can each be analogous to a domain. If an outage occurs, parties involved in the overall electrical landscape can check their own area of responsibility to identify a possible cause of the outage. The outage can cause an event indication such as, "I have no light," or "My TV is not working." Both of these event indications are indicative of a health indicator that is, "electricity is not being delivered to the customers." Configuration items in the electrical system can be defined, such as: electricity is generated in the power station, electricity is delivered to the customers by the cables, which are connected to both the power station and the customer's outlets, and the customers use the electricity. Such definitions can provide a semantic net, with more information than a mere topology of the electric distribution network.

A machine (e.g., a computing device) can include a tangible non-transitory medium 336 storing a set of machine readable instructions. Although, with respect to FIG. 3, only the management server 320 is specifically illustrated as including a tangible non-transitory storage medium 336, a number of machines (e.g., computing devices such as servers) can include such a storage medium 336 for use with examples of the present disclosure. The tangible non-transitory medium 336 can include volatile and/or non-volatile memory such as random access memory (RAM), magnetic memory such as a hard disk, floppy disk, and/or tape memory, a solid state drive (SSD), flash memory, phase change memory, and the like.

Figure 4:
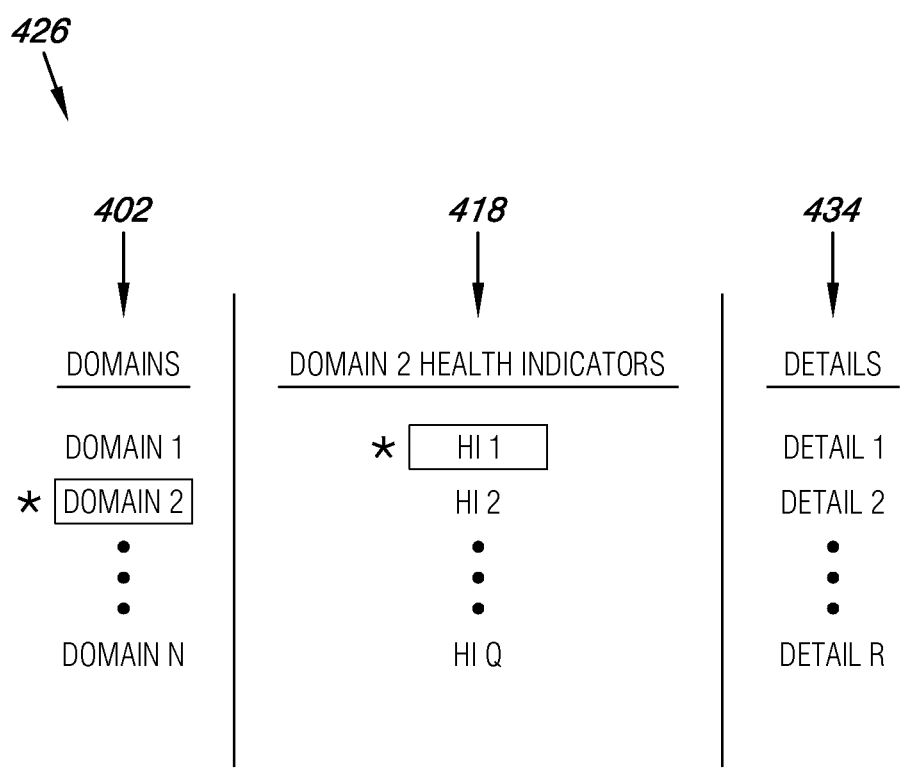
FIG. 4 illustrates an example of a user interface displaying information including a number of health indicators according to the present disclosure.

FIG. 4 illustrates an example of a user interface 426 displaying information including a number of health indicators 418 according to the present disclosure. The user interface 426 includes a listing of domains 402 (e.g., domain 1, domain 2, . . . , domain N) for a particular IT landscape. As illustrated, domain 2 has been selected by a user. Thus, a number of health indicators 418 (e.g., HI 1, HI 2, . . . , HI Q) for domain 2 are displayed. As illustrated, health indicator 1 has been selected by a user. Thus, a number of details 434 (e.g., detail 1, detail 2, . . . , detail R) regarding health indicator 1 are displayed.

The example user interface 426 illustrated in FIG. 4 highlights how the present disclosure can be used to quickly provide meaningful information to a user (e.g., a network administrator, a business manager, etc.) regarding health aspects of an IT landscape. Examples of domains 402 and health indicators 418 have been described herein. Additional examples of health indicators 418 include cache performance, processor usage, database mirroring status, disk read-write rate, server load, number of connected users, etc. Examples of details 434 regarding a health indicator 418 include a name of the health indicator, a type of the health indicator, a description of the health indicator, values for data related to the health indicator, and any warnings or alerts related to the health indicator, among other details 434. The details 434 can allow a user to drill down into more detail concerning the health indicator 418 (e.g., by allowing linked access to more detailed information concerning event indictions).

Figure 5:
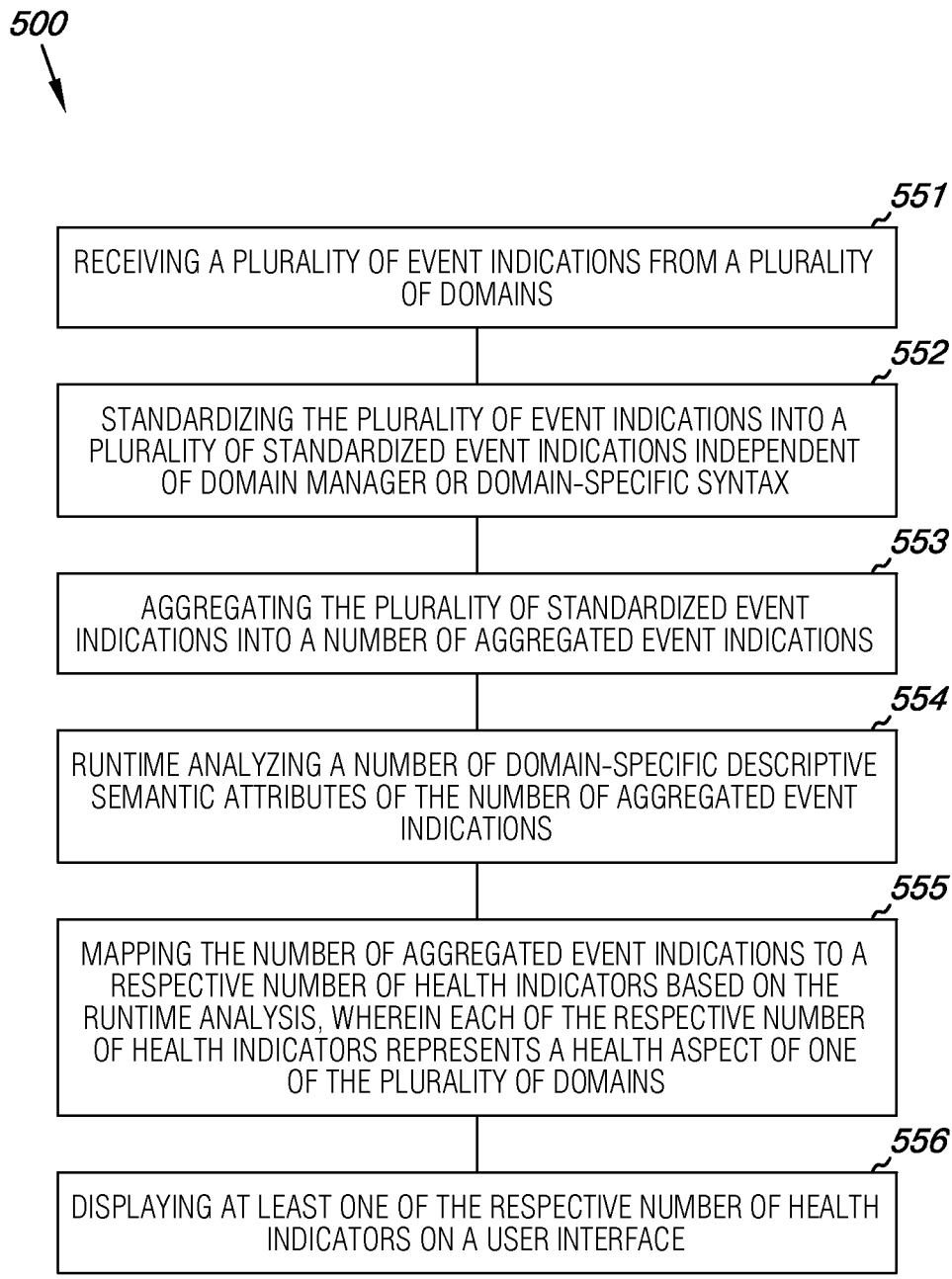
FIG. 5 provides a flow chart illustrating an example of a method for cross-domain business service management according to the present disclosure.

FIG. 5 provides a flow chart 500 illustrating an example of a method for cross-domain business service management according to the present disclosure. The method includes receiving 551 a plurality of event indications from a plurality of domains and standardizing 552 the plurality of event indications into a plurality of standardized event indications independent of a domain manager or domain-specific syntax. The method includes aggregating 553 the plurality of standardized event indications into a number of aggregated event indications. The method also includes runtime analyzing 554 a number of domain-specific descriptive semantic attributes of the number of aggregated event indications. The method includes mapping 555 the number of aggregated event indications to a respective number of health indicators based on the runtime analysis 554, wherein each of the respective number of health indicators represents a health aspect of one of the plurality of domains. The method includes displaying 556 at least one of the respective number of health indicators on a user interface.

Machine readable and executable instructions and/or logic, which are operable to perform the method described in connection with FIG. 5, can be present in whole or in part in the examples of other figures. Embodiments, however, are not limited to the particular examples given herein.

It is to be understood that the above description has been made in an illustrative fashion, and not a restrictive one. Although specific examples have been illustrated and described herein, other component arrangements, instructions, and/or device logic can be substituted for the specific examples shown.

What is claimed:

1. A method for cross-domain business service management, comprising:
    receiving a plurality of event indications from a plurality of domains, wherein each of the plurality of event indications includes domain specific syntax and descriptive semantic attributes identifying a particular event;
    providing a domain-specific content pack for a domain selected from the plurality of domains, wherein the content pack includes information identifying a plurality of functional configuration relationships between the domain and the plurality of domains, and includes information defining a plurality of health aspects of the domain;
    standardizing the plurality of event indications into a plurality of standardized event indications independent of the domain specific syntax;
    aggregating the plurality of standardized event indications by the descriptive semantic attributes, into a plurality of aggregated event indications, wherein each of the plurality of aggregated event indications represents a same, unique event;
    analyzing at runtime a plurality of the descriptive semantic attributes of the plurality of aggregated event indications by interpreting each of the plurality of aggregated event indications according to a corresponding content pack;
    mapping the plurality of aggregated event indications to a respective number of health indicators based on the runtime analysis, wherein each of the respective number of health indicators represents a health aspect of one of the plurality of domains; and
    displaying at least one of the respective number of health indicators on a user interface.

2. The method of claim 1, wherein receiving the plurality of event indications includes receiving one of the plurality of event indications from at least one of:
    a first data collector associated with at least one of the plurality of domains; and
    a second data collector associated with at least one domain managers associated with at least one of the plurality of domains.

3. The method of claim 1, wherein the domain specific syntax includes domain manager specific syntax.

4. The method of claim 1, wherein the method includes:
    defining a plurality of configuration items between the plurality of domains based on the information included in the content packs;
    applying the plurality of defined configuration items to a topology map of the plurality of domains to create a semantic network; and
    displaying the semantic network on the user interface.

5. The method of claim 4, wherein the method includes analyzing a cause of one of the plurality of aggregated events by executing a defined rule in the runtime component included in the content pack corresponding to the domain associated with the one of the plurality of aggregated events.

6. A system for cross-domain business service management, comprising:
    a plurality of domains;
    a plurality of data collectors to monitor the plurality of domains and generate a plurality of event indications, wherein each of the plurality of event indications includes domain specific syntax and descriptive semantic attributes identifying a particular event;
    the system includes a plurality of third party domain managers to monitor the plurality of domains and generate event indications in addition to the event indications generated by the plurality of data collectors; and
    the event processing framework comprises a first party event processing framework.

7. The system of claim 6, wherein the system includes a configuration management database to establish a relationship between the plurality of domains and an overall business service facilitated by the plurality of domains based on the content pack for each of the plurality of domains.

8. The system of claim 6, wherein:
    map the plurality of aggregated event indications to a respective number of health indicators based on the runtime analysis, wherein each of the respective number of health indicators represents one of the plurality of health aspects of one of the plurality of domains;
    display at least one of the respective number of health indicators or the plurality of functional configuration relationships between the plurality of domains on a user interface.

9. The system of claim 6, wherein the event processing framework is provided by one of the group including:
    a server; and
    a virtual machine.

10. A tangible non-transitory medium storing a set of machine readable instructions for cross-domain business service management, which when executed by a machine, cause the machine to:
    standardize a plurality of event indications, wherein each of the plurality of event indications includes domain specific syntax and descriptive semantic attributes identifying a particular event, to be independent of domain specific syntax into a plurality of standardized event indications;

aggregate the plurality of standardized event indications by the descriptive semantic attributes, into a plurality of aggregated event indications wherein each of the plurality of aggregated event indications represents a same, unique event;

identify a plurality of functional configuration relationships between the plurality of domains and an overall network;

define a plurality of health aspects of each of the plurality of domains;

provide a domain-specific content pack for each of the plurality of domains, wherein the content pack includes information identifying the plurality of functional configuration relationships, and includes information defining the plurality of health aspects;

runtime analyze a plurality of the descriptive semantic attributes of the plurality of aggregated event indications by interpreting each of the plurality of aggregated event indications according to a corresponding content pack;

an event processing framework including:
    a management server to provide the event processing framework, wherein the management server includes a content pack for a domain selected from the plurality of domains and wherein the content pack includes information identifying a plurality of functional configuration relationships between the domain and the plurality of domains, and includes information defining a number of health aspects of the domain;
    a runtime component to:
        standardize the plurality of event indications into a plurality of standardized event indications independent of the domain specific syntax;
        aggregate the plurality of standardized event indications by the descriptive semantic attributes, into a number of aggregated event indications wherein each of the number of aggregated event indications represents a same, unique event;
        analyze a number of the descriptive semantic attributes of the number of aggregated event indications by interpreting each of the number of aggregated event indications according to a corresponding content pack; and
        map the number of aggregated event indications to a respective number of health indicators based on the analysis, wherein each of the respective number of health indicators represents a health aspect of one of the plurality of domains; and
    a user interface display to display at least one of the number of health indicators.

11. The tangible non-transitory medium of claim 10, wherein the instructions cause the machine to:
    apply the identified plurality of functional configuration relationships to a topology map of the plurality of domains to create a semantic network; and
    display the semantic network on the user interface.

12. The tangible non-transitory medium of claim 10, wherein the instructions cause the machine to:
    analyze a cause of one of the plurality of aggregated events; and
    display a result of the analysis of the cause of the one of the plurality of aggregated events on the user interface.

13. The tangible non-transitory medium of claim 10, wherein the instructions cause the machine to display at least one of the respective number of health indicators without displaying a corresponding one of the plurality of event indications.

* * * * *

UNITED STATES PATENT AND TRADEMARK OFFICE
CERTIFICATE OF CORRECTION

PATENT NO. : 8,850,321 B2  
APPLICATION NO. : 12/821457  
DATED : September 30, 2014  
INVENTOR(S) : Seeger et al.

Page 1 of 2

It is certified that error appears in the above-identified patent and that said Letters Patent is hereby corrected as shown below:

In the Claims

Column 10, lines 33-38, Claim 6, delete "the system includes a plurality of third party domain managers to monitor the plurality of domains and generate event indications in addition to the event indications generated by the plurality of data collectors; and the event processing framework comprises a first party event processing framework." and insert -- an event processing framework including: a management server to provide the event processing framework, wherein the management server includes a content pack for a domain selected from the plurality of domains and wherein the content pack includes information identifying a plurality of functional configuration relationships between the domain and the plurality of domains, and includes information defining a number of health aspects of the domain; a runtime component to: standardize the plurality of event indications into a plurality of standardized event indications independent of the domain specific syntax; aggregate the plurality of standardized event indications by the descriptive semantic attributes, into a number of aggregated event indications wherein each of the number of aggregated event indications represents a same, unique event; analyze a number of the descriptive semantic attributes of the number of aggregated event indications by interpreting each of the number of aggregated event indications according to a corresponding content pack; and map the number of aggregated event indications to a respective number of health indicators based on the analysis, wherein each of the respective number of health indicators represents a health aspect of one of the plurality of domains; and a user interface display to display at least one of the number of health indicators. --, therefor Column 10, lines 45-53, Claim 8, delete "map the plurality of aggregated event indications to a respective number of health indicators based on the runtime analysis, wherein each of the respective number of health indicators represents one of the plurality of health aspects of one of the plurality of domains; display at least one of the respective number of health indicators or the plurality of functional configuration relationships Signed and Sealed this  
Seventeenth Day of February, 2015

Michelle K. Lee  
*Deputy Director of the United States Patent and Trademark Office*

CERTIFICATE OF CORRECTION (continued)
U.S. Pat. No. 8,850,321 B2 between the plurality of domains on a user interface." and
insert -- the system includes a plurality of third party domain managers to monitor the plurality of domains and generate event indications in addition to the event indications generated by the plurality of data collectors; and the event processing framework comprises a first party event processing framework. --, therefor.

Column 11, lines 20-34 and column 12, lines 1-15, Claim 10, delete "an event processing framework including: a management server to provide the event processing framework, wherein the management server includes a content pack for a domain selected from the plurality of domains and wherein the content pack includes information identifying a plurality of functional configuration relationships between the domain and the plurality of domains, and includes information defining a number of health aspects of the domain; a runtime component to: standardize the plurality of event indications into a plurality of standardized event indications independent of the domain specific syntax; aggregate the plurality of standardized event indications by the descriptive semantic attributes, into a number of aggregated event indications wherein each of the number of aggregated event indications represents a same, unique event; analyze a number of the descriptive semantic attributes of the number of aggregated event indications by interpreting each of the number of aggregated event indications according to a corresponding content pack; and map the number of aggregated event indications to a respective number of health indicators based on the analysis, wherein each of the respective number of health indicators represents a health aspect of one of the plurality of domains; and a user interface display to display at least one of the number of health indicators." and
insert -- map the plurality of aggregated event indications to a respective number of health indicators based on the runtime analysis, wherein each of the respective number of health indicators represents one of the plurality of health aspects of one of the plurality of domains; display at least one of the respective number of health indicators or the plurality of functional configuration relationships between the plurality of domains on a user interface. --, therefor.